(12) United States Patent
Lund et al.

(10) Patent No.: US 8,361,425 B2
(45) Date of Patent: Jan. 29, 2013

(54) $CO_2$ ABSORPTION METHOD (75) Inventors: Randi Lund, Oslo (NO); Knut Sanden, Nesbru (NO); Anne-Helene Haaland, Nesoddtangen (NO); Trygve Andreas Rikheim, Kolbotn (NO); Simon Woodhouse, Strommen (NO)

(73) Assignee: Aker Clean Carbon AS, Lysaker (NO)

( * ) Notice: Subject to any disclaimer, the term of this patent is extended or adjusted under 35 U.S.C. 154(b) by 0 days.

(21) Appl. No.: 12/529,952

(22) PCT Filed: Mar. 3, 2008

(86) PCT No.: PCT/NO2008/000078
§ 371 (c)(1),
(2), (4) Date: Sep. 4, 2009

(87) PCT Pub. No.: WO2008/108657
PCT Pub. Date: Sep. 12, 2008

(65) Prior Publication Data
US 2010/0061904 A1    Mar. 11, 2010

(30) Foreign Application Priority Data
Mar. 5, 2007  (NO) .................................. 20071206

(51) Int. Cl.
B01D 53/62 (2006.01)
B01D 53/14 (2006.01)

(52) U.S. Cl. .................. 423/228; 423/220; 423/229

(58) Field of Classification Search .................. 423/220, 423/228, 229
See application file for complete search history.

(56) References Cited

U.S. PATENT DOCUMENTS

| | | |
|---|---|---|
| 3,563,695 A | 2/1971 | Benson |
| 3,725,529 A | 4/1973 | Giammarco et al. |
| 4,044,100 A | 8/1977 | McElroy, Jr. |
| 4,079,117 A | 3/1978 | Butwell |
| 4,112,051 A | 9/1978 | Sartori et al. |
| 4,397,660 A | 8/1983 | Van der Pas-Toornstra |

(Continued)

FOREIGN PATENT DOCUMENTS

| | | |
|---|---|---|
| EP | 0502596 A1 | 9/1992 |
| GB | 2331526 A | 5/1999 |

(Continued)

OTHER PUBLICATIONS

Persichini, Carlo, "International Search Report for PCT/NO2008/000078" as completed Jun. 20, 2008, (5 pages).

(Continued)

Primary Examiner — Daniel C McCracken
Assistant Examiner — Daniel Berns
(74) Attorney, Agent, or Firm — Winstead PC (57) ABSTRACT A method for removing $CO_2$ in a exhaust gas from combustion of carbonaceous material, in which method the exhaust gas is brought in countercurrent flow with a liquid $CO_2$ absorbent in a contact section of an absorption column, to produce a $CO_2$ depleted exhaust gas that is released into the atmosphere and a $CO_2$ rich absorbent that is withdrawn from the absorption column, wherein the exhaust gas is introduced into the absorption column at a temperature above about 90 and the exhaust gas is cooled in the absorption column by countercurrent flow of the liquid absorbent in the absorption column, is described.

6 Claims, 7 Drawing Sheets

U.S. PATENT DOCUMENTS

| | | | |
|---|---|---|---|
| 4,942,734 A | | 7/1990 | Markbreiter et al. |
| 5,061,465 A | | 10/1991 | Carter |
| 5,318,758 A | | 6/1994 | Fujii et al. |
| 5,339,633 A | * | 8/1994 | Fujii et al. .................. 60/648 |
| 5,528,811 A | | 6/1996 | Abidin et al. |
| 2007/0006565 A1 | | 1/2007 | Fleischer et al. |

FOREIGN PATENT DOCUMENTS

| | | |
|---|---|---|
| NO | 321817 | 7/2006 |
| SU | 1349770 A1 | 11/1987 |
| WO | WO-2005/045316 A2 | 5/2005 |
| WO | WO-2005/087350 A1 | 9/2005 |
| WO | WO-2006/043820 A1 | 4/2006 |
| WO | WO-2008/063079 A2 | 5/2008 |
| WO | WO-2008/063082 A2 | 5/2008 |

OTHER PUBLICATIONS

U.S. Appl. No. 12/596,066, Woodhouse et al.

Persichini, Carlo, "International Search Report" for PCT/NO2008/000140 as mailed Jul. 31, 2008 (3 pages).

Tel-Tek, "Treflis brukt til CO2-fangst", Sluttrapport, Tel-Tek, Report No. 2106040-1, Jun. 2006, (19 pages).

* cited by examiner

Fig. 1

(PRIOR ART)

Fig. 7 ium carbonate, see e.g. U.S. Pat. No. 5,528,811, and different amines,
CO₂ ABSORPTION METHOD

TECHNICAL FIELD

The present invention relates to field of $CO_2$ capture from a gas mixture. More specifically the present invention relates to $CO_2$ capture from an exhaust gas from the combustion of carbonaceous material. Most specifically the present invention relates to an improved method and plant for cooling and absorbing $CO_2$ from a combustion gas.

BACKGROUND

The continually increasing combustion of fossil fuel, such as coal, natural gas and oil, during the last centuries has resulted in an increase in the concentration of $CO_2$ in the atmosphere. The increasing concentration of $CO_2$ has caused concern due to the greenhouse effect caused by $CO_2$. The greenhouse effect is suspected already to have caused at least some of the changes in the climate that have been seen during the last decades, and is according to simulation models suspected to cause even more and potentially dramatic changes in the climate of planet earth.

This has caused a call for action from scientists, environmentalists and politicians throughout the world, to stabilize or even reduce the discharge of $CO_2$ from combustion of fossil fuel to the atmosphere. This may be achieved by capturing and safe depositing of $CO_2$ from the exhaust gas from thermal power plants and other plants where fossil fuel is combusted.

The captured $CO_2$ may be injected in sub terrain formations such as aquifers, oil wells for enhanced oil recovery or in depleted oil and gas wells for deposition. Tests indicate that $CO_2$ remains in the sub terrain formation for thousands of years and is not released into the atmosphere.

Capturing of $CO_2$ from a gas by means of absorption is well known and has been used for decades, e.g. for removal of $CO_2$ (and other acid gases) from produced natural gas at gas fields. The absorbents used or suggested in the prior art have been different aqueous alkaline solutions, such as potassium carbonate, see e.g. U.S. Pat. No. 5,528,811, and different amines, see e.g. U.S. Pat. No. 4,112,051, U.S. Pat. No. 4,397,660 and U.S. Pat. No. 5,061,465. Separation of $CO_2$ from exhaust gas from thermal power plants by means of an amine solution, is known e.g. from U.S. Pat. No. 4,942,734.

Common for these $CO_2$ capturing solution is that the gas mixture to be separated is introduced countercurrent to the aqueous adsorbent in an absorber column. The gas leaving the absorber column is $CO_2$ depleted (or acid gas depleted), whereas the $CO_2$ (or other acid gas) leaves the absorber column together with the absorbent. The absorbent is regenerated in the regenerator column and returned to the absorber column. Amine is regenerated by stripping the amine solution with steam in the regeneration column. The steam is generated in the reboiler at the base of the column.

As illustrated above $CO_2$ as such is well known in the art. However, there is a need for several improvements in the $CO_2$ capturing process to make $CO_2$ free or low $CO_2$ emission thermal power plants economically profitable.

The plants for capturing of $CO_2$ are relative large, complex and expensive constructions. It is therefore desired to reduce the size, complexity and cost of the Plants.

Capturing of $CO_2$ is carried out at the expense of the efficiency of a thermoelectric power plant utilizing fossil fuel, so that the output of electrical power and/or medium temperature heat from a thermoelectric power plant is reduced. The reduced efficiency compared with a traditional plant makes these facilities less profitable. Improvements in the efficiency, i.e. reducing the energy cost in the $CO_2$ capturing process, are therefore sought.

The currently preferred absorbents are aqueous solutions of different amines. The commonly used amines are alkanol amines, such as e.g., diethanol amine, mono methyl ethanolamine, aminoethyl ethanolamine, 2-(Methylamino)etanol, MDEA as well as other amines known by skilled man in the art. The absorption of $CO_2$ to the amine absorbents is a reversible, exothermic reaction. Accordingly, heat has to be supplied to the regenerator column to reverse the absorption and release the $CO_2$.

The amine absorbents are exposed for degradation during the absorption/desorption cycle described above. The exhaust gas from the combustion of carbonaceous material comprises oxygen which will react with the amines dependent on the type of amine, the oxygen concentration, the total contact time between oxygen and amine, temperature etc. High temperature, long contact time and high oxygen content in the gas to be treated, are factors that increase the degradation of the amine. The degradation of the amine is also a factor adding cost to the capture of $CO_2$. The degraded amines have to be replaced and deposited resulting in increased operational costs of the plant.

The exhaust outlet temperature from a traditional thermal power plant is normally 80 to 120° C. as the gas at lower temperatures has no value in production of electrical power, and no or limited value as a heat source in other processes.

A cooler is therefore introduced between the outlet of a thermal power plant and the absorber column. The most common cooler is a tower in which the exhaust gas is cooled by a countercurrent flow of water spray both to cool the gas and saturate the gas with water vapor. The cooled and saturated gas leaving the cooler has normally a temperature of about 50° C. and is directly introduced into the absorption column.

The cooler and absorber for a $CO_2$ capturing plant, constitutes a substantial part of the total investments for the plant. A decrease of the size and complexity and thus the total cost of investments for the cooler and absorber is therefore sought. Additionally, there are significant operating costs connected to the cooler. There is a pressure loss across the cooler resulting in increased power consumption. Additionally, the cooler requires large power consuming pumps.

An objective of the present invention is thus to provide solutions that makes it possible reduce to cost of investments for the cooler and absorber in a $CO_2$ capturing plant, without an unacceptable increase in operational costs and/or decrease in efficiency of the plant.

SHORT DESCRIPTION OF THE INVENTION

The present invention provides a method for removing $CO_2$ in a exhaust gas from combustion of carbonaceous material, in which method the exhaust gas is brought in countercurrent flow with a liquid $CO_2$ absorbent in a contact section of an absorption column, to produce a $CO_2$ depleted exhaust gas that is released into the atmosphere and a $CO_2$ rich absorbent that is withdrawn from the absorption column, wherein the exhaust gas is introduced into the absorption column at a temperature above about 90° C. and the exhaust gas is cooled in the absorption column by countercurrent flow of the liquid absorbent in the absorption column. It has surprisingly been found that the inlet cooler for the absorption column may be omitted, and thus both cost of investment and cost of operation, may be reduced without a corresponding loss in absorption capacity of the absorption column. The loss of absorption capacity due to the cooling in the absorption column may be compensated by an increase of about 10% of the contact section. The omission of the inlet cooler has, however a significant positive effect on the cost of investment and the area requirement for a $CO_2$ capturing plant, as the inlet cooler is an expensive component requiring valuable area in the plant. The savings for the omission of the inlet cooler is far greater than the added cost for increasing either the size of or circulation rate through the contact section.

According to one embodiment, the absorbent is withdrawn from the absorption column immediately after leaving the contact section. By removing the absorbent from the absorption column immediately after leaving the contact section, the time in which the absorbent is in contact with the hot exhaust gas is reduced, thus reducing the degradation of the absorbent.

According to a second embodiment, the present invention provides an absorption column for removing $CO_2$ from an exhaust gas from combustion of carbonaceous material comprising an inlet section for the exhaust gas, one or more packed contact sections(s) for effecting countercurrent flow of the exhaust gas and a liquid absorbent, and means for withdrawing $CO_2$ depleted exhaust gas from column, and means for withdrawing $CO_2$ rich absorbent from the column, wherein the means for withdrawing the $CO_2$ rich absorbent comprises a collection tray arranged between the inlet section (10) and the contact section(s).

DETAILED DESCRIPTION OF THE INVENTION

Figure 1:
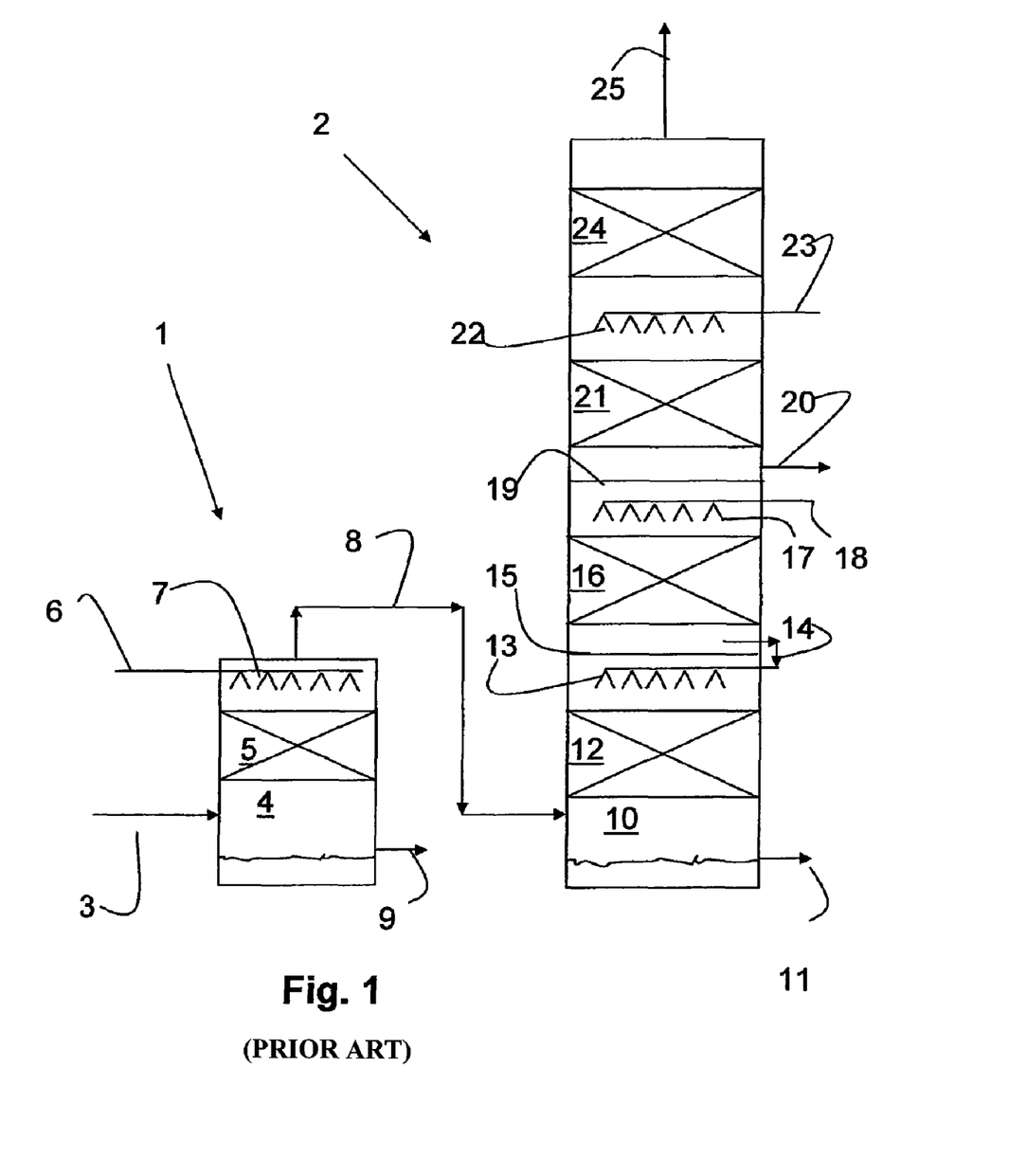
FIG. 1 illustrates an absorption column and an inlet cooler according to the prior art.

FIG. 1 illustrates an inlet cooler 1 and an absorption column 2 according to the prior art. Combustion gas, typically having a temperature of 90-140° C. is introduced through an exhaust line 3 into an inlet cooler chamber 4. The combustion gas is cooled in a contact zone 5 in the inlet cooler 1 by a countercurrent flow of cooling water. The cooling water is introduced through a cooling water line 6 and is sprayed by means of liquid distribution means 7 over the contact zone 5. Due to the direct countercurrent contact with the cooling water, the combustion gas is both cooled and saturated with water vapor. The cooled combustion gas is withdrawn from the top of the inlet cooler through a line 8 and introduced into the absorption column, whereas cooling water is collected in the bottom of the cooler and withdrawn through a withdrawal line 9.

The cooled and saturated combustion gas in line 8 is introduced in an inlet chamber 10 at the bottom of the absorption column 2. From the inlet chamber 10, the gas flows upwards in the absorption column and countercurrent to liquid absorbent in one or more contact section(s) 12, 16. The contact section(s) is(are) preferably comprises a structural packing to increase the surface area, or the contact area between the liquid absorbent and the gas. The illustrated absorption column is provided with two serially connected contact sections 12, 16. After leaving the contact sections 12, 16, the gas is washed by a countercurrent flow of water in a washing section 21 to remove any amine in the gas flow. Washing water is introduced through a washing water line 23 and sprayed at the top of the washing section 21 by means of liquid distribution means 22, is collected at a water collection plate 19 below the washing section and is withdraw through a washing water removal line 20. Water droplets in the washed gas flow is then preferably removed in a demister section 24 before the lean exhaust gas, from which 80 to 99% of the $CO_2$ has been removed by adsorption, is withdrawn through a lean exhaust gas withdrawal line 25.

Lean, or $CO_2$ pure, absorbent is introduced into the absorption column through a lean absorbent line 18 and is sprayed onto the top of the upper contact section 16 by means of liquid distribution means 17. The absorbent flows through the upper contact section 16 and is collected at an absorbent collection plate 15 below the contact section 16. The absorbent collection plate 15 may be a bubble cap collection plate or any other type of collection plate known by the skilled man in the art. The semi lean absorbent having absorbed $CO_2$ from the exhaust gas, is withdrawn in a bypass line 14 and sprayed at the top of the lower contact section 12. After flowing through the lower contact section 12, the rich absorbent having absorbed more $CO_2$ from the exhaust gas, is collected at the bottom of the stripper column and is withdrawn to a rich absorbent withdrawal line 11.

The rich absorbent may be regenerated in a regenerator, e.g. as described in the applicants own Norwegian patent applications NO2006 5411 NO2006 5412 or NO2006 5413, the description of which are incorporated in the present description as reference. Regenerated absorbent is then introduced as lean absorbent in line 18.

The liquid distribution means 7, 17, respectively, may be any means suitable to distribute a liquid over the contact sections. Suitable liquid distribution means 7, 17 may be nozzles, troughs or piping with small holes to allow the liquid to be distributed over the contact sections.

Figure 2:
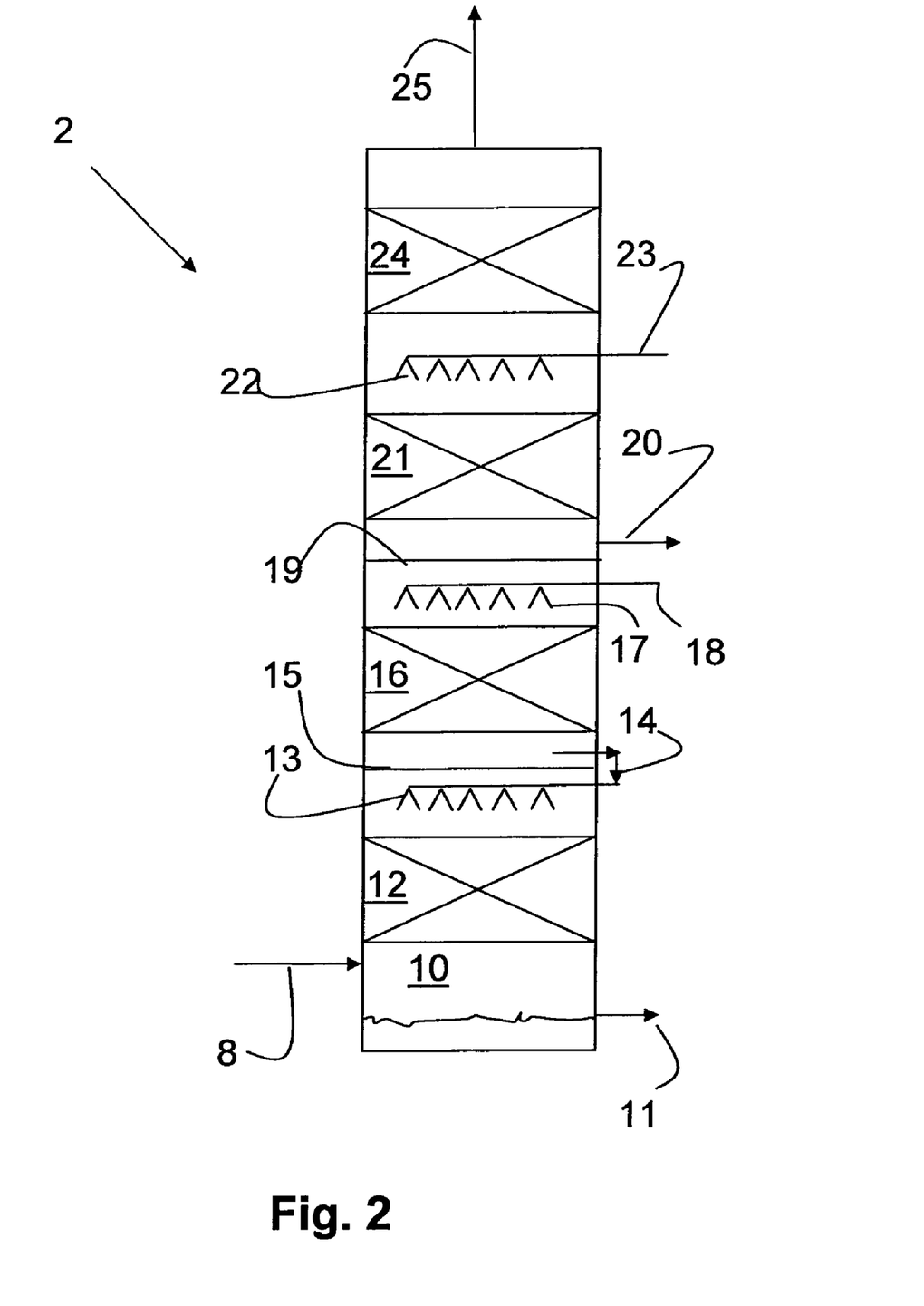
FIG. 2 illustrates an absorption column according to a first embodiment of the present invention.

The embodiment illustrated in FIG. 2, corresponds to the above described solution according to prior art, with the difference that the cooler is omitted. By introducing exhaust gas not saturated with water and at a temperature typically from about 90-130° C., the exhaust gas is cooled by evaporation of water from the absorbent to saturate the exhaust gas and results only a slight increase of temperature of the absorbent in the lowermost part of the contact section. This slight increase of temperature and the corresponding slight decrease in absorbing capacity of the absorbent, may be compensated by an increase in the height of the contact sections(s) and/or an increased flow of absorbent. The extra costs for the increased height of the packing or increased flow of absorbent to absorb the same amount of $CO_2$ are, however, relatively small compared with the cost of a cooler according to the prior art.

Figure 3:
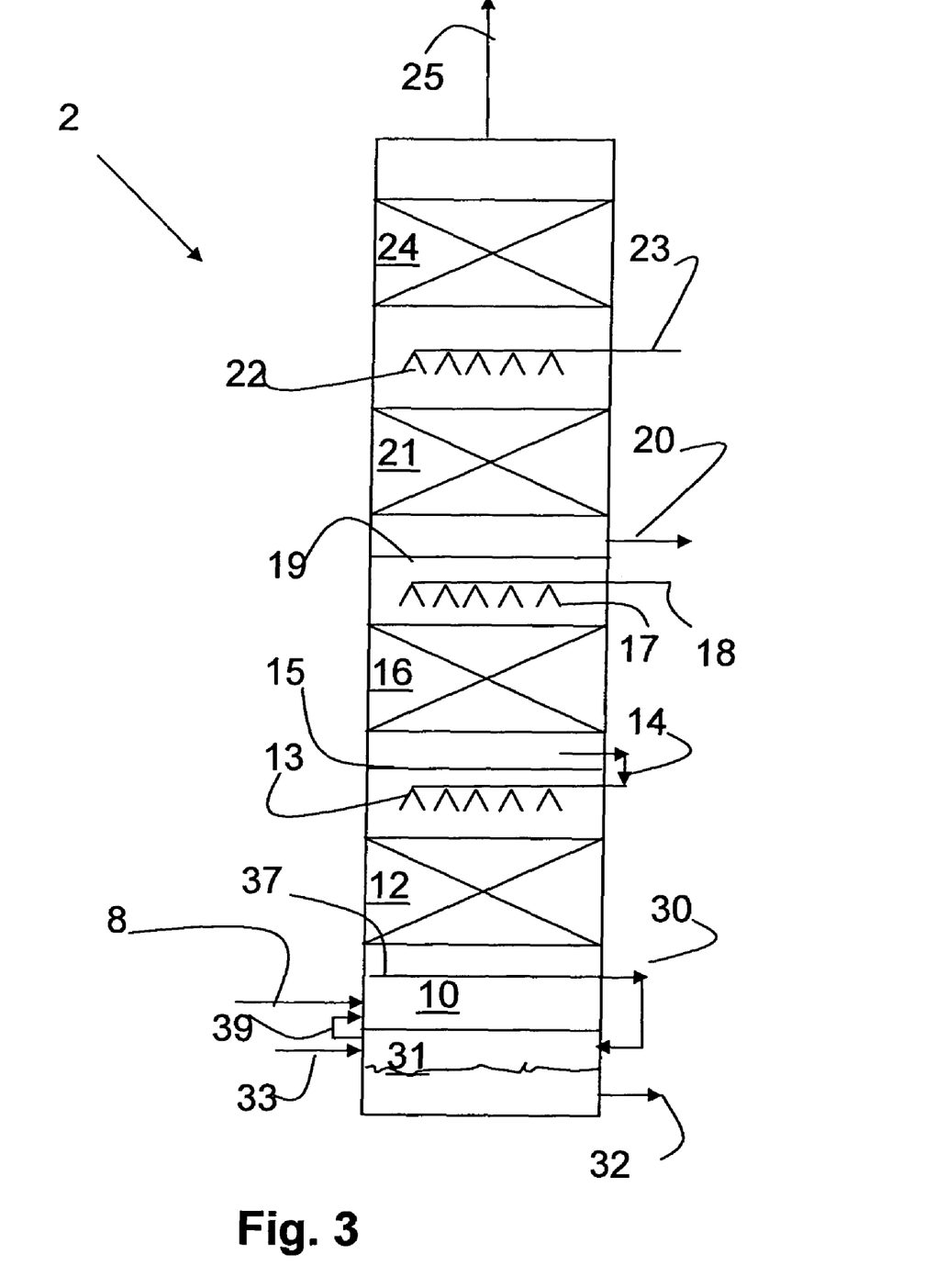
FIG. 3 illustrates an absorption column according to a second embodiment or the present invention.
Figure 4:
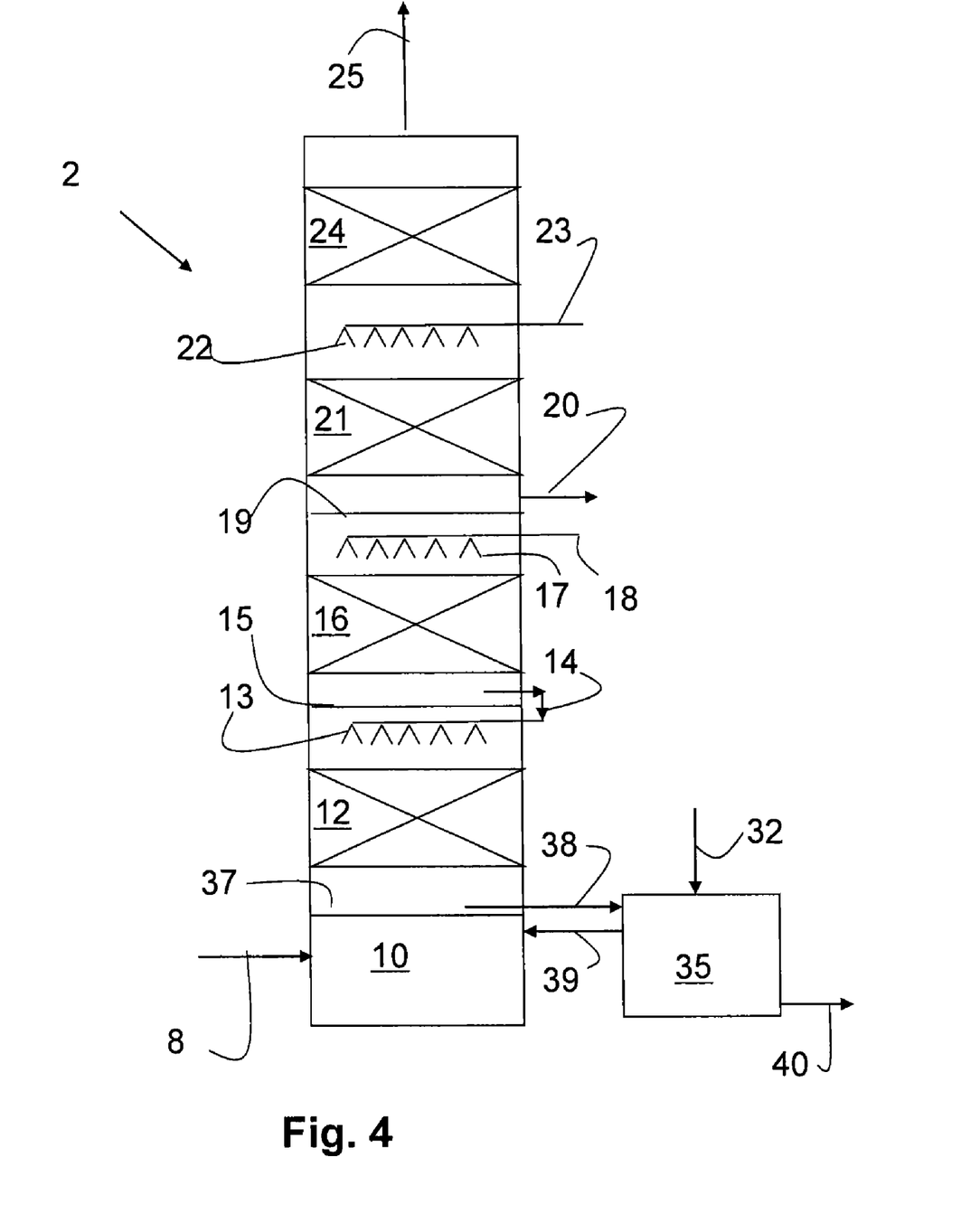
FIG. 4 illustrates an absorption column according to a third embodiment of the present invention.

FIGS. 3 and 4 illustrates two different variations of an embodiment where the rich absorbent leaving the lower contact section is collected in a collection tray 37 beneath the structured packing of the lower contact section 12, to collect the rich absorbent flowing out of the contact section. The collected rich absorbent is withdrawn from the collection tray 37 and is transferred to a rich absorbent storage tank 31, 35 through lines 30, 38, respectively. By removing the rich absorbent from the absorption column immediately after leaving contact section the exposure time of the absorbent for oxygen and high temperature is minimized. This results in a reduced degradation of the absorbent compared with the solutions according to the prior art.

To reduce the degradation of the absorbent even more, an inert gas, such as e.g. nitrogen, may be introduced into the tank 31, 35 through an inert gas line 30, 32, respectively, as a blanketing system to further reduce the contact between absorbent and oxygen. As illustrated in FIG. 4, the tank 35 is optionally vented into the inlet chamber of the absorbing column through a venting line 39 to avoid the need for cleaning the gas removed from the tank 35 to adjust the pressure therein.

The rich absorbent in the tank 31, 35 is carried to a regeneration plant through a rich amine return line 32, 40, respectively.

To reduce degradation of the absorbent in the tank 31, 35, respectively, by oxygen present in the absorbent, a not shown stripper column in which a stripper gas flows countercurrent to the rich absorbent, may be introduced in line 30. The stripper gas may be $CO_2$ from the above mentioned absorbent regenerator. The $CO_2$ removed from the stripper column may be dried and compressed and exported from the plant as the oxygen level even after stripping of the absorbent is sufficiently low for most applications of the $CO_2$.

EXAMPLE

The simulation programs ProTreat and CO2Sim were used for simulation of the temperature profile in a contact section in an absorber for $CO_2$.

The simulated values from the simulations were compared with measured values from a test contact section having a diameter of 300 mm using MEA as absorbent amine.

Figure 5:
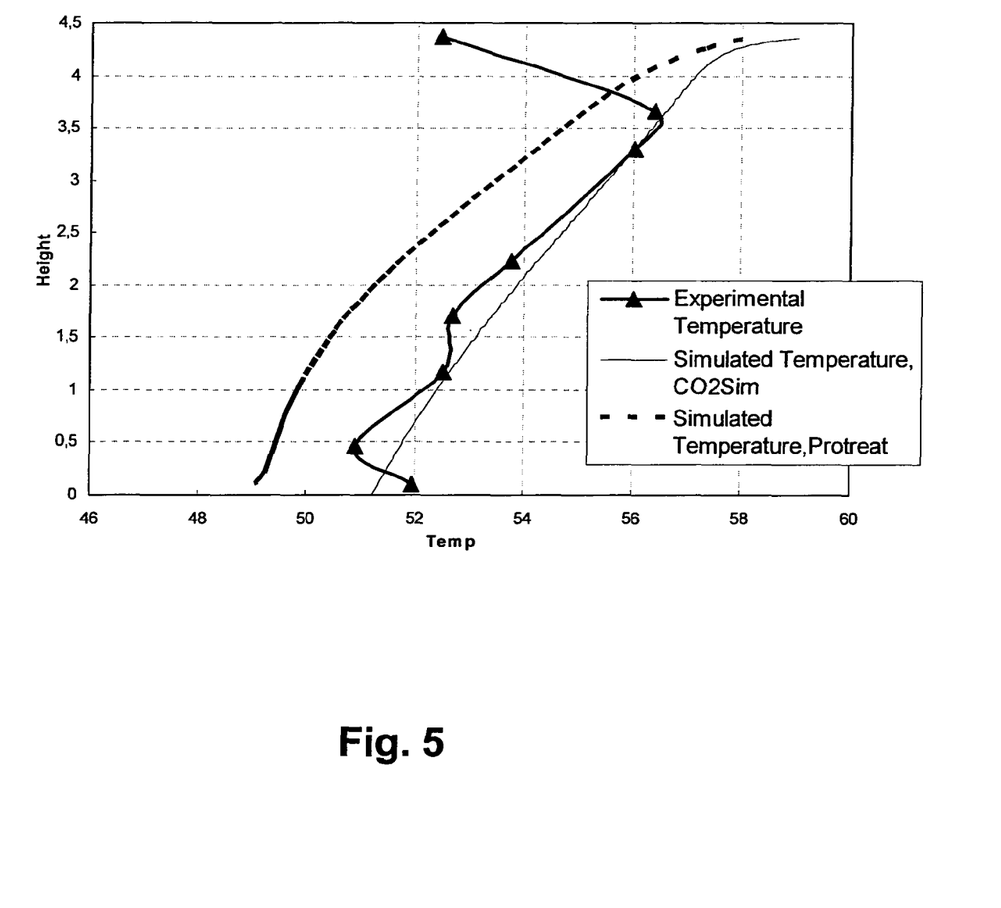
FIG. 5 is a graphical presentation of temperature as a function of height in a contact section for an inlet temperature of 50° C. and a saturation temperature of 47° C.
Figure 6:
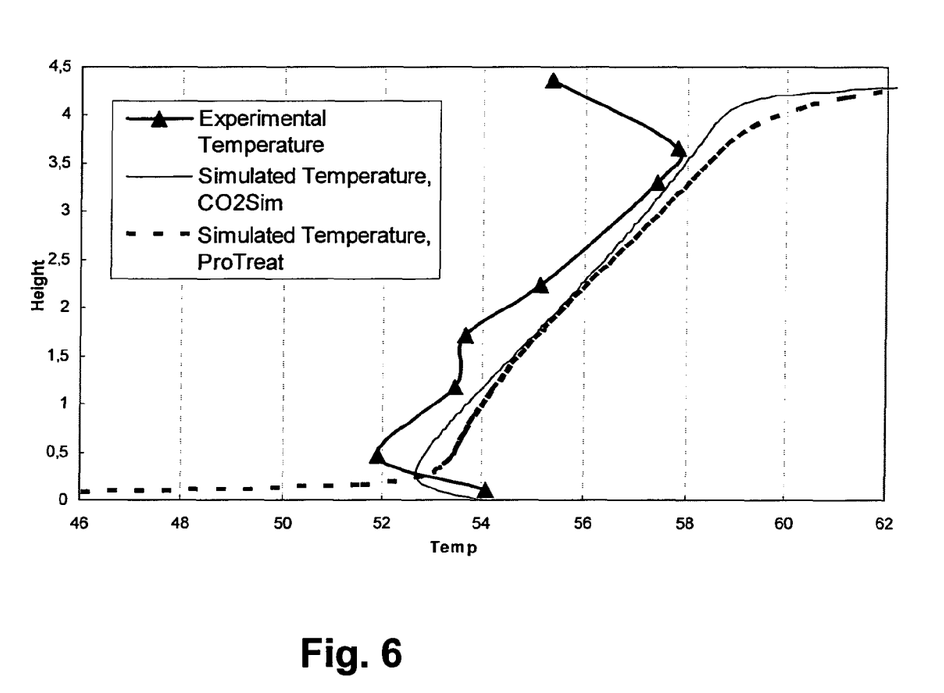
FIG. 6 is a graphical presentation of temperature as a function of height in a contact section for an inlet temperature of 90° C., and saturation temperature of 50° C.

Simulated values and measured values from the test absorber for gas inlet temperature of 50° C. and 90° C. are presented in FIGS. 5 and 6, respectively. The gas entering at 50° C. corresponds to a typical cooled and humidified exhaust gas, having a dew point of about 47° C. and thus being almost saturated with water, whereas the gas entering at 90° C. corresponds to a typical exhaust gas that is released from a natural gas fired thermal power plant, having a dew point of about 44° C.

As illustrated in the FIG. 5 the temperature in the contact section increases substantially linear as a function of the height, due to the exothermal absorption reaction between $CO_2$ and the amine. FIG. 6 illustrates the fact that the gas entering the contact section at a temperature of 90° C. is effectively cooled by evaporation of water from the absorbent solution. From a height of about 0.5 m the temperature again increases due to the exothermal absorption reaction as mentioned above. From the height of 0.5 m the temperature difference between the two cases is about 2° C.

Figure 7:
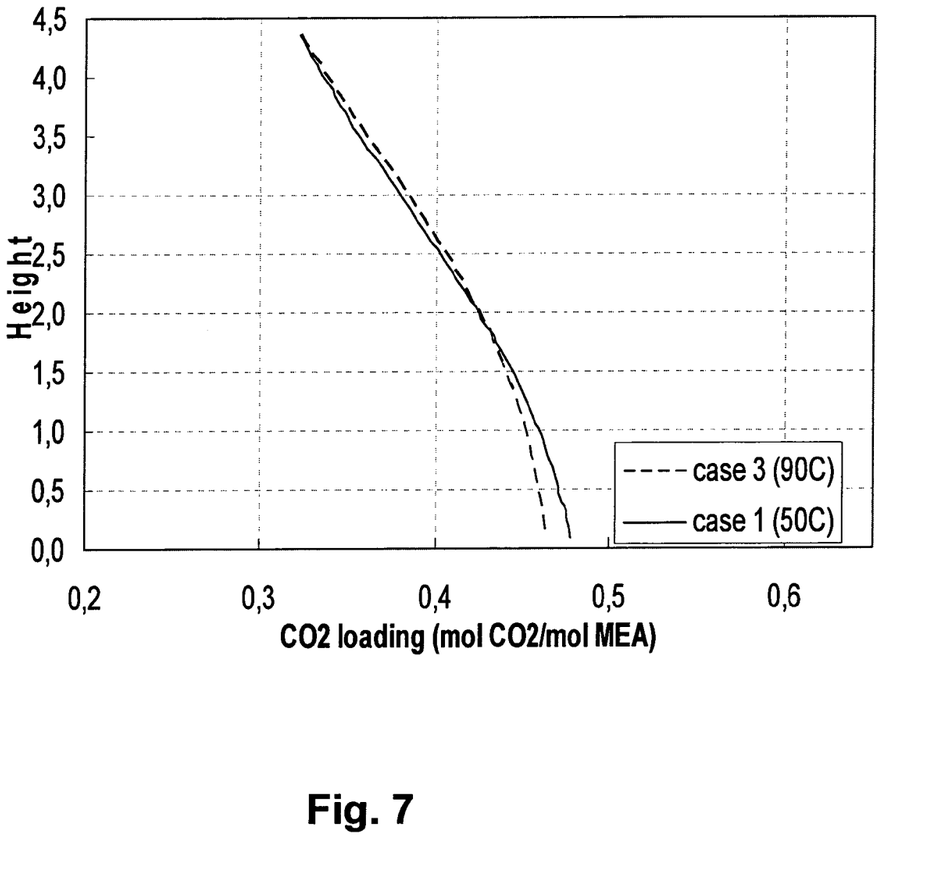
FIG. 7 is a graphical presentation of the absorption capacity of an absorbent at an inlet temperature of 50° C. compared to 90° C.

FIG. 7 illustrates the $CO_2$ loading of the absorbent (mole $CO_2$/mole MEA) as a function of the height of the contact section for the two test and simulation cases having inlet temperatures of 50 and 90° C., respectively. Due to the higher temperature in the lower part of the contact section, the loading is slightly lower for the higher inlet temperature than the lower temperature exhaust gas.

DISCUSSION

The test results and simulations confirm a close agreement between the simulations and the experimental tests. The simulation model may therefore be used to predict the performance of the absorber under varying temperatures and humidity of exhaust gas.

The results confirms that the inlet cooler upstream for the absorption column in a plant for capturing of $CO_2$ from the exhaust gas from a thermal power plant fired by natural gas, may be omitted according to the present invention. The cost for omitting the inlet cooler is somewhat lower absorption efficiency. This lower absorption efficiency may be compensated for by increasing the circulation rate of the absorbent by about 6%, or by increasing the height of the contact section(s) by less than 10%, or about 0.5 m.

The experimental results and the simulations also confirms that the hot (90° C.) and dry exhaust gas is cooled to a temperature that is slightly higher than the temperature of a typical cooled and humidified exhaust gas, in the lower 0.5 m or less of the contact section. This cooling effect is mostly contributed to evaporation of water from the absorbent. This evaporation will concentrate the amine solution, which may be favorable in the lower part of the absorber.

Accordingly, both the simulated values and the results from an actual test of an absorption tower confirm the present inventor's theory that the inlet cooler between a natural gas powered thermal power plant may be omitted and thus make substantial savings possible. This finding is in contradiction to the accepted view in the field that an inlet cooler is necessary for cooling the exhaust gas from a thermal power plant before introduction into an absorption column for absorption of $CO_2$.

The invention claimed is:

1. A method of removing $CO_2$ in an exhaust gas, the method comprising:
   introducing exhaust gas comprising oxygen and products from combustion of carbonaceous material into an absorption column;
   wherein the exhaust gas, when introduced into the absorption column, is dry;
   bringing the exhaust gas in countercurrent flow with a liquid $CO_2$ absorbent, the liquid $CO_2$ absorbent being an aqueous solution of amines, in a contact section of the absorption column, giving a $CO_2$-rich absorbent and a $CO_2$-depleted exhaust gas; cooling the $CO_2$-depleted exhaust gas such that, as the $CO_2$-depleted exhaust gas leaves the contact section, the $CO_2$-depleted exhaust gas is at
   a substantially lower temperature than a temperature of the exhaust gas as the exhaust gas is introduced into the absorption column;
   wherein the cooling step is performed via evaporation of water from the liquid $CO_2$ absorbent to saturate the exhaust gas in a lower part of the contact section;
   releasing the $CO_2$-depleted exhaust gas leaving the contact section into the atmosphere;
   withdrawing the $CO_2$-rich absorbent from the absorption column; and
   wherein the temperature of the exhaust gas introduced into the absorption column is greater than about 90° C.

2. The method according to claim 1, wherein the liquid $CO_2$ absorbent is an aqueous solution of diethanol amine, mono methyl ethanolamine, aminoethyl ethanolamine, 2-(methylamino) ethanol or MDEA.

3. A method according to claim 1, further comprising withdrawing the liquid $CO_2$ absorbent from the absorption column immediately after the liquid $CO_2$ absorbent leaves the contact section.

4. A method according to claim 1, wherein the temperature of the $CO_2$-depleted exhaust gas leaving the contact section is lower than 50° C.

5. The method according to claim 4, further comprising transferring the withdrawn liquid $CO_2$-rich absorbent from the absorption column to a holding tank.

6. The method according to claim 5, further comprising introducing an inert gas into the holding tank.

* * * * *